United States Patent
Berstis

(10) Patent No.: US 6,631,515 B1
(45) Date of Patent: Oct. 7, 2003

(54) METHOD AND APPARATUS TO REDUCE CODE SIZE AND RUNTIME IN A JAVA ENVIRONMENT

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 09/159,955

(22) Filed: Sep. 24, 1998

(51) Int. Cl.⁷ .................................................. G06F 9/45
(52) U.S. Cl. ........................................ 717/140; 717/148
(58) Field of Search .............................. 717/4, 5, 140, 717/148, 151–153

(56) References Cited

U.S. PATENT DOCUMENTS

| | | | |
|---|---|---|---|
| 5,479,418 A | 12/1995 | Hughes-Hartogs | 371/40 |
| 5,652,899 A | 7/1997 | Mays et al. | 395/773 |
| 5,668,999 A | 9/1997 | Gosling | 395/704 |
| 5,701,470 A | 12/1997 | Joy et al. | 395/614 |
| 5,737,607 A | 4/1998 | Hamilton et al. | 395/701 |
| 5,740,441 A | 4/1998 | Yellin et al. | 395/704 |
| 5,748,694 A | 5/1998 | Gosling | 395/705 |
| 5,757,925 A | 5/1998 | Faybishenko | 380/49 |
| 5,809,512 A * | 9/1998 | Kato | 707/502 |
| 5,923,892 A * | 7/1999 | Levy | 712/31 |
| 6,044,220 A * | 3/2000 | Breternitz | 717/5 |

FOREIGN PATENT DOCUMENTS

EP 810522 AZ 12/1997 ........... G06F/9/445

OTHER PUBLICATIONS

Klemm. Practical Guidelines for Boosting Java Server Performance. May 1999. pp. 25–34. ACM.*
Dean et al. An Optimizing Compiler for Object–Oriented Languages. 1996. pp. 83–100. ACM.*

* cited by examiner

Primary Examiner—Gregory Morse
Assistant Examiner—Wei Zhen
(74) Attorney, Agent, or Firm—Duke W. Yee; Jeffrey S. LaBaw; Stephen J. Walden, Jr.

(57) ABSTRACT

A method in distributed data processing system for optimizing execution of a class. A frequency of execution of paths in bytecodes for methods that are in the class is identified within the distributed data processing system. A portion of the paths is compiled into precompiled native machine code for the data processing system using the frequency of execution of paths. The class is sent to a client in the distributed data processing system.

27 Claims, 8 Drawing Sheets

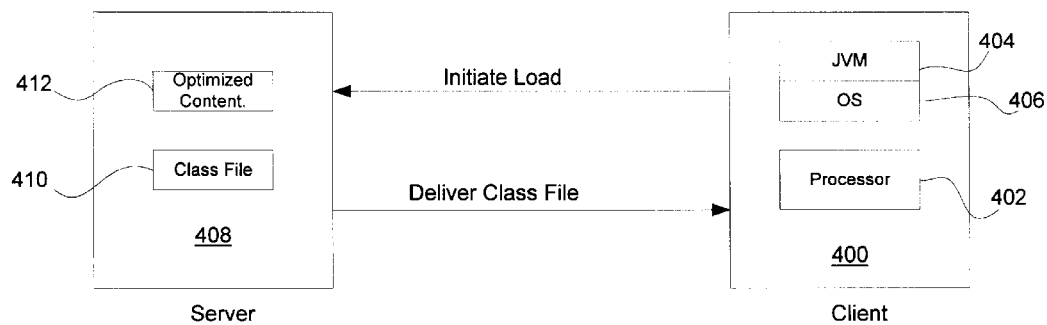
Figure 4
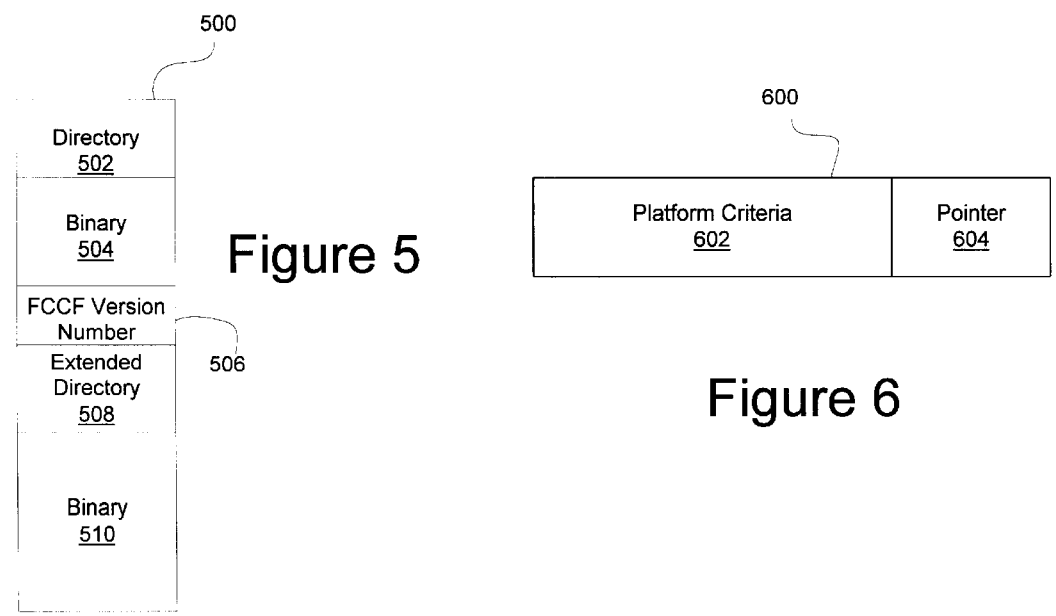
Figure 5
Figure 6

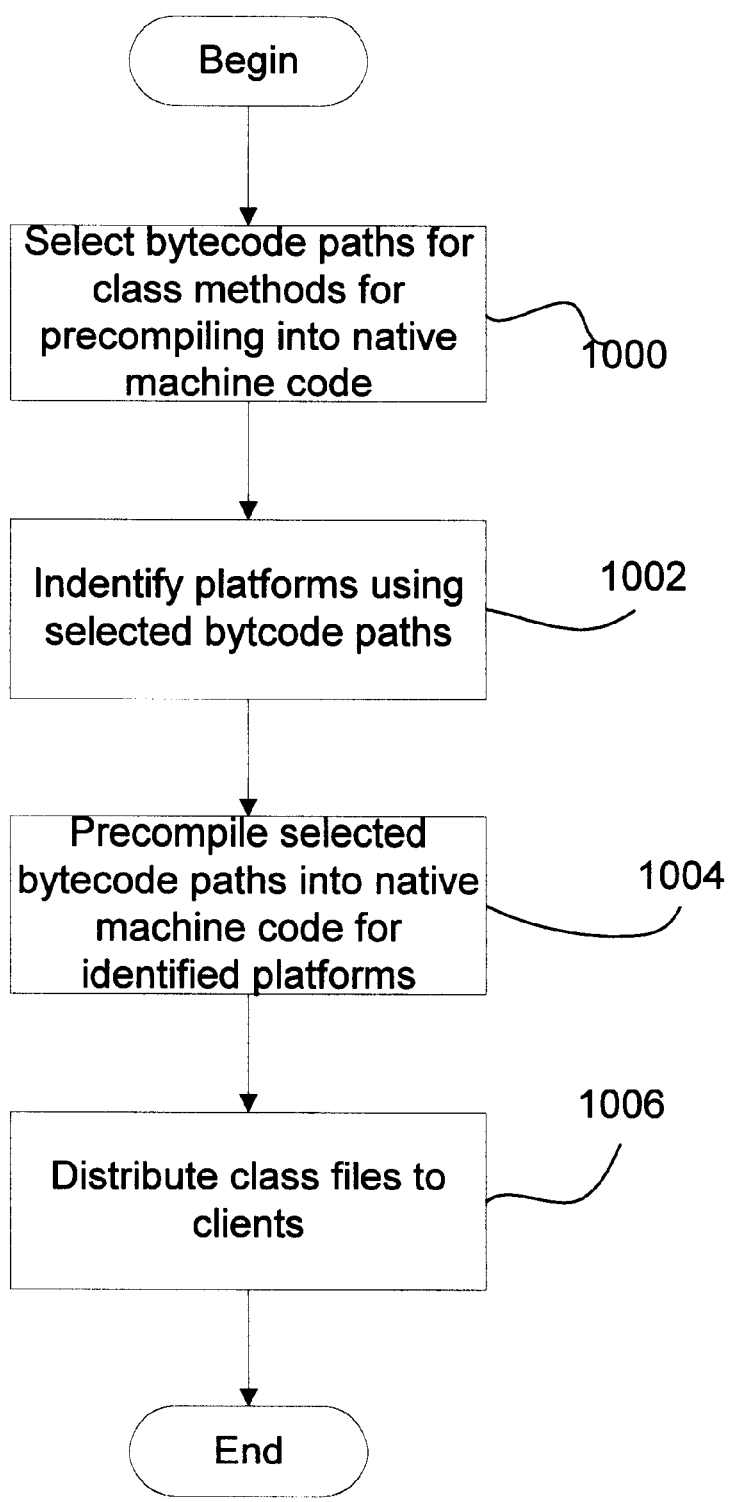

METHOD AND APPARATUS TO REDUCE CODE SIZE AND RUNTIME IN A JAVA ENVIRONMENT

BACKGROUND OF THE INVENTION

1. Technical Field

The present invention related generally to an improved data processing system and in particular to an improved method and apparatus for executing Java programs in a data processing system. Still more particularly, the present invention provides a method and apparatus for reducing code size and runtime in an object-oriented environment.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program that controls the actual computer or central processing unit (CPU), and device drivers that control the input and output devices (I/O) such as printers and terminals.

A number of application programs are usually present waiting to use the CPU. The operating system determines which program will run next, how much of the CPU time it will be allowed to use, and what other computer resources the application will be allowed to access and use. Further, each application program will require a special input or output device and the application program must transfer its data to the operating system, which controls the device drivers.

A network containing a number of computers may be formed by having these computers, also referred to as "nodes" or "network computers", communicate with each other over one or more communications links, which is an aggregation which is a computer network. Today, many computer workstations are connected to other workstations, file servers, or other resources in a network. Each computer on a network is connected to the network via an adapter card or other similar means, which provides an ability to establish a communications link to the network.

Applications are often sent to a computer from the server. Java applications are becoming increasingly more prevalent as the type of application sent between server and client computers. Java applications are common on the Internet, and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The architecture-neutral file format consists of bytecode instructions that are generated by a Java compiler and are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code.

A JVM also may include just-in-time (JIT) compilers as an example of a run-time technology used to increase the performance of Java programs. A JIT compiler provides an increase in performance by compiling methods into native machine instructions before executing them. Interpreting Java bytecodes takes more time than executing the equivalent function in native machine code. As a result, native machine code provides for increased application or program execution speeds. Native machine code, however, consumes more storage than Java bytecodes. It is desirable in a Java programming environment to reduce both the amount of memory storage required while increasing execution speed. In this endeavor, JIT compilers have been used to compile bytecode into native machine code to increase execution speed, but end up using even more space because of storing both bytecode and native machine code. In addition, JIT compilers also result in excess time being taken up in performing the JIT compilations. The JIT compiler itself consumes a considerable amount of storage as well.

Thus, it would be advantageous to have an improved method and apparatus for reducing the size of the code while increasing executing speed for code.

SUMMARY OF THE INVENTION

The present invention provides a method in a distributed data processing system for optimizing execution of a class. A frequency of execution of paths in bytecodes for methods that are in the class is identified within the distributed data processing system. A portion of the paths is compiled into precompiled native machine code for the data processing system using the history of the frequency of execution of paths. The class is sent to a client in the distributed data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating loading of a class file in accordance with a preferred embodiment of the present invention;

FIG. 5 is a diagram of a fully caffienated class file (FCCF) in accordance with a preferred embodiment of the present invention;

FIG. 6 is an illustration of an entry in the extended directory in accordance with a preferred embodiment of the present invention;

FIG. 10 is a flowchart of a process for selectively pre-compiling native code in accordance with a preferred embodiment of the present invention.

DETAILED DESCRIPTION OF THE PREFERRED EMBODIMENT

Figure 1:
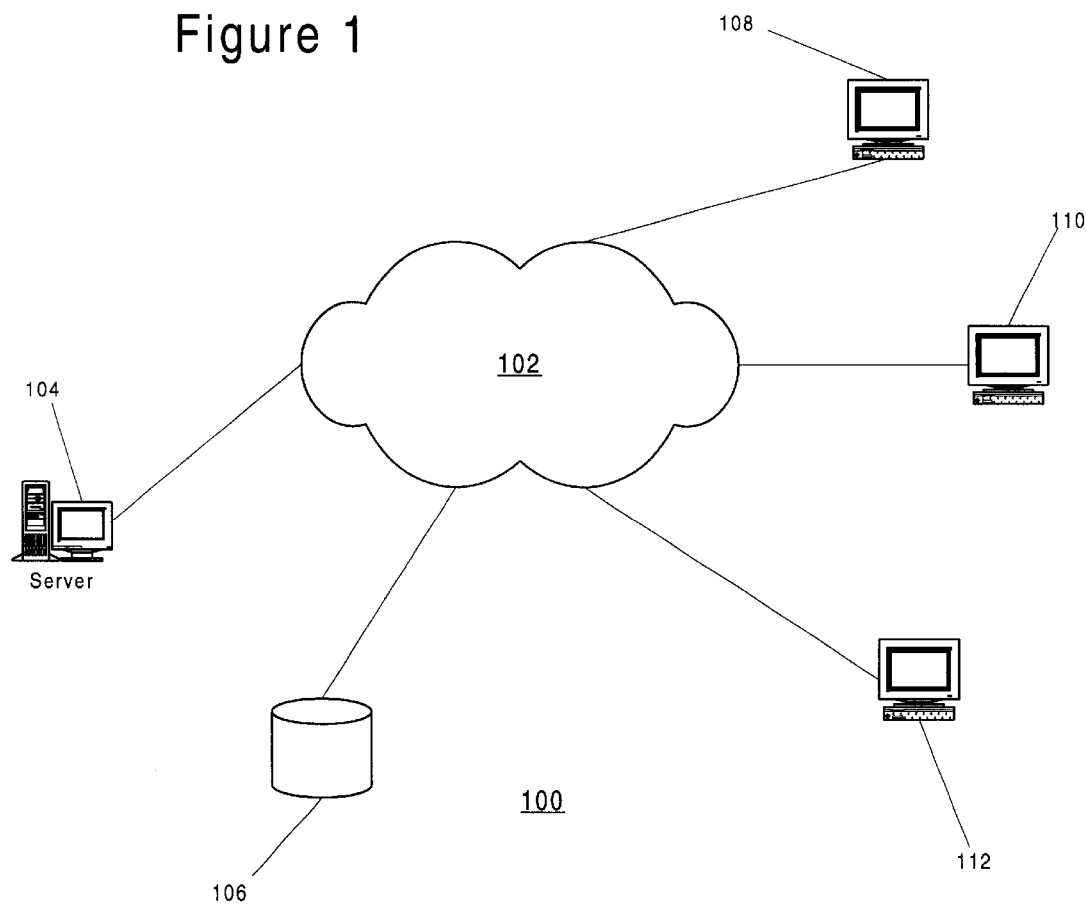
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers of network computers. For purposes of this application, a network computer is any computer, coupled to a network, which receives a program or other application from another computer coupled to the network. In the depicted example, server 104 provides data, such as boot files, operating system images, and applications to NCs 108–112. NCs 108, 110, and 112 are clients to server 104. Distributed data processing system 100 may include additional servers, clients, and other devices not shown. FIG. 1 is intended as an example, and not as an architectural limitation for the processes of the present invention.

Figure 2:
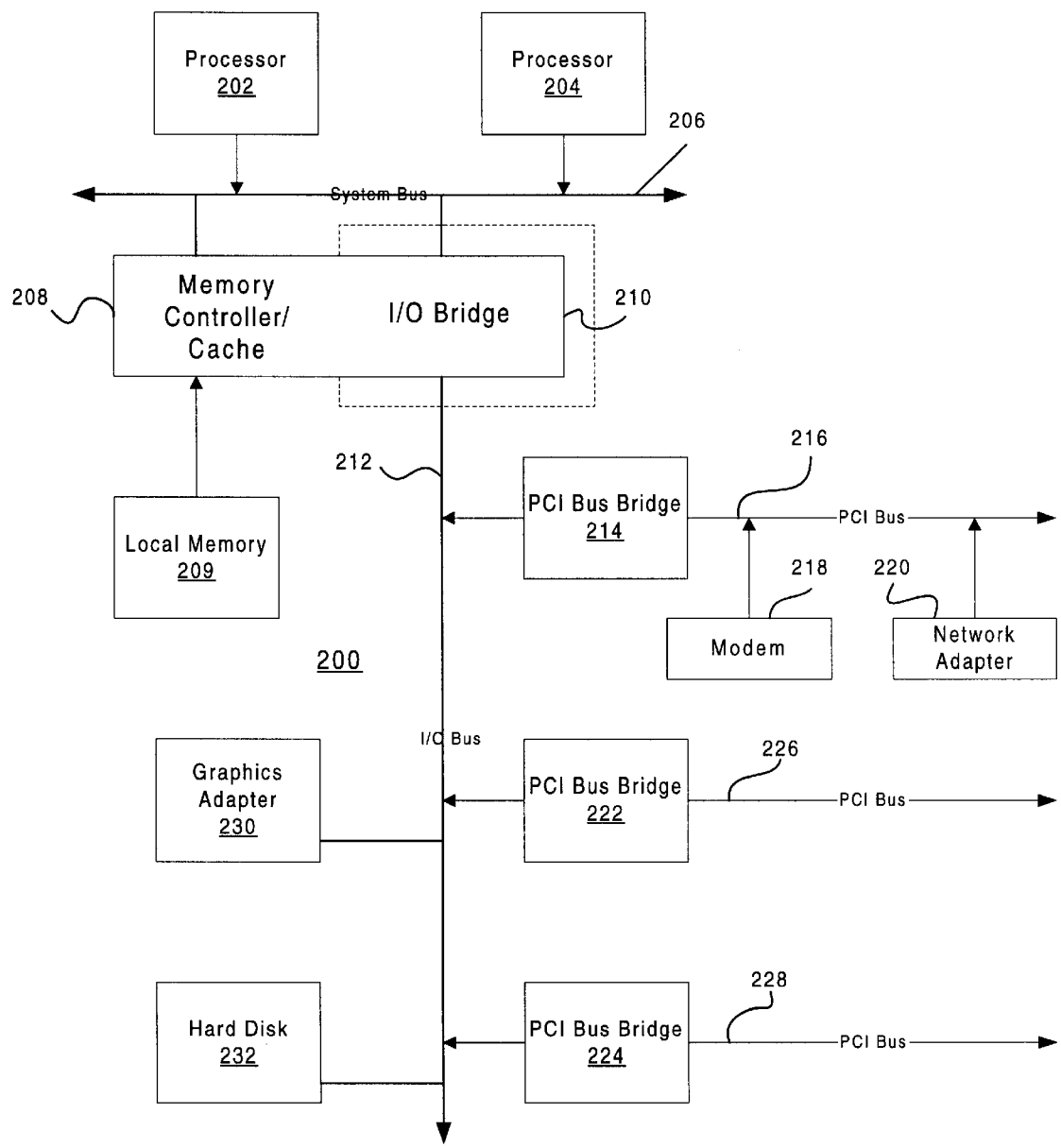
FIG. 2 is a block diagram of a data processing system which may be implemented as a server in accordance with the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
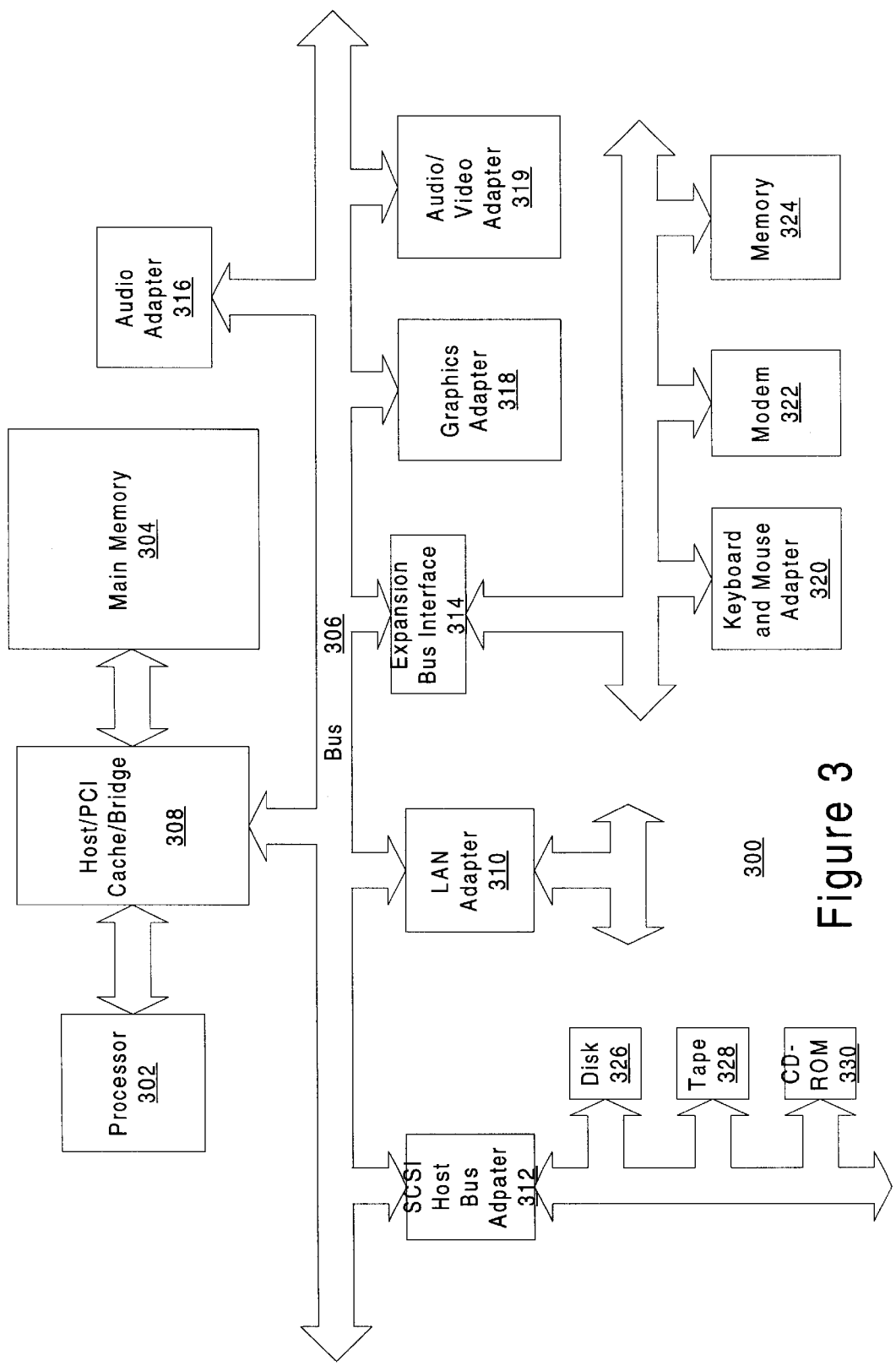
FIG. 3 is a block diagram of a data processing system which may be implemented as a network computer in accordance with a preferred embodiment of the present invention.

With reference now to FIG. 3, a block diagram of a data processing system 300 in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 112 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 1. The operating system may be a commercially available operating system such as Java OS, which is available from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302. Java OS is typically used in data processing systems with constrained memory and typically no hard disk drives. The processes of the present invention may be used in other systems with less constrained memory and with storage devices, such as hard disk drives.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

The present invention provides a method, data processing system, and instructions for increasing the execution speed while reducing storage required for executing Java classes. In particular, statistics about the frequency of execution of various code paths in the bytecode of class methods. These statistics are used to create a profile indicating the portions of code that are most often executed. These portions of code are precompiled into native machine code. Bytecode is then provided for little executed paths while native machine code is provided for frequently executed paths.

Turning now to FIG. 4, a diagram illustrating loading of bytecodes and native machine code is depicted in accordance with a preferred embodiment of the present invention. Network computer 400 in FIG. 4 includes a processor 402, which executes Java Virtual Machine (JVM) 404 and operating system (OS) 406. Server 408 includes class files 410 and optimized content 412. Optimized content 412 may be native machine code for a particular type of data processing system. Class files 410 contain bytecodes and also may include optimized content, such as native machine code.

In the depicted example, network computer 400 collects statistics about the frequency of execution of various code paths in the bytecode methods being executed by processor 402. In the depicted example, an interpreter in JVM 404 on a client 400 is used to collect statistics about the frequency of execution of various code paths. The statistics are sent to server 408 upon unloading of classes on client 400. These statistics also may be gathered on demand, periodically, or after a specific statistics gathering period. The server uses the statistics to determine paths for which native machine code is to be compiled. Server 408 sends a class file from class files 410 to client 400. Both bytecodes and precompiled native machine code are returned by server 408.

According to the present invention, class files 410 include fully caffienated class files (FCCFs), which are used to deliver bytecodes and native machine code for methods in class files 410. These FCCFs contain bytecodes as normal class files, which allows existing JVMs to use these FCCFS. In addition, FCCFs include optimized content, such as data, native machine code, or pointers to optimized content for the network computer. An enhanced JVM is able to recognize and use optimized content contained within FCCFs. Although the depicted examples use FCCFs to deliver the bytecodes and native machine code, other mechanisms may be employed by server 408 to deliver the code to client 400.

With reference now to FIG. 5, a diagram of a fully caffienated class file (FCCF) is depicted in accordance with a preferred embodiment of the present invention. FCCF 500 includes a directory 502 and binary 504, which are normally found in a standard Java class file. In addition, a FCCF version number 506, an extended directory 508, and binary 510 are found in FCCF 500. Directory 502 and binary 504 are standard Java class file entries. Binary 504 is a binary stream of data in the form of bytecodes. A JVM that is unable to recognize additional FCCF information will ignore FCCF version number 506, extended directory 508, and binary 510. A standard JVM will be able to read the bytecodes within binary 504 using directory 502 and process FCCF 500 as a regular Java class file. On the other hand, a JVM that is able to process these additional sections will process extended directory 508 to gain entry to binary 510, which is a binary stream of data that contains optimized content. This optimized content may include, for example, preformatted data or optimized content for a platform, such as native machine code. In the depicted example, an extended directory 508, also referred to as a table of contents, includes a number of entries.

Turning now to FIG. 6, an illustration of an entry in the extended directory in FIG. 5 is depicted in accordance with a preferred embodiment of the present invention. Entry 600 is an entry in extended directory 508 in FIG. 5 and contains platform criteria 602 and pointer 604. In the depicted examples, platform criteria 602 contains criteria that maps to particular processors, JVMs, and operating systems. This criteria is compared to the processor, JVM, and operating system of the network computer on which the FCCF is loaded. A match in platform criteria 602 for an entry results in the associated pointer 604 being used to identify the location of a directory for the particular platform. Pointer 604 may point to a directory within extended directory 508. Alternatively, pointer 604 may point to an external source of optimized content. For example, pointer 604 may be a universal resource locator to optimized content accessed using an Internet protocol.

More information on creating class files that include bytecodes and optimized content, such as, for example, native machine code may be found in a patent application entitled Method and Apparatus For Optimizing Execution of Java Programs, Ser. No. 09/126,282, filed Jul. 30, 1998, assigned to the same assignee, which is incorporated herein by reference.

Figure 7:
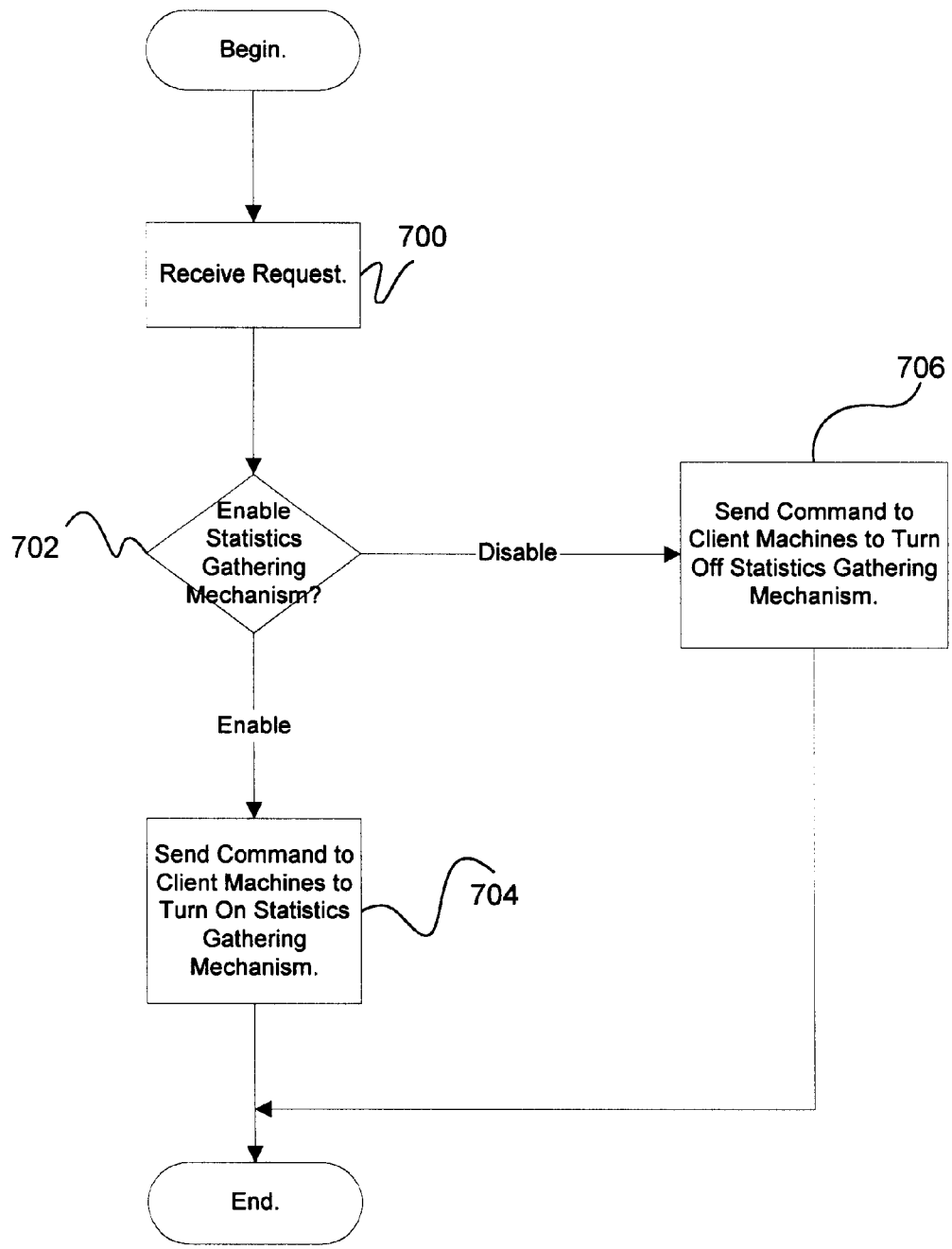
FIG. 7 is a flowchart of a process used by an interpreter in a Java virtual machine to record statistics about execution of code in a client computer in accordance with a preferred embodiment of the present invention.

Turning now to FIG. 7, a flowchart of a process for enabling and disabling a mechanism for gathering statistics from client machines is depicted in accordance with a preferred embodiment of the present invention. The process begins by receiving a request (step 700). A determination is made as to whether the request is to enable or disable the mechanism for gathering statistics (step 702). If the request is to enable the gathering of statistics, a command is sent to the client machines to turn on a statistics gathering mechanism located within the client machine (step 704) with the process terminating thereafter. The mechanism may be turned on by various mechanisms including, for example, setting a bit, which is checked by the client machine before gathering statistics. Alternatively, the command could be one that causes the loading of a JVM that includes processes for gathering statistics. If on the other hand, the request is to disable the statistics gathering mechanism, a command is sent to the client machines to turn off the statistics gathering mechanism (step 706) with the process terminating thereafter. This command may involve resetting a bit such that the client machine does not gather statistics in response to checking this bit. Alternatively, the statistics gathering mechanism may be disabled by causing the client machine to load a JVM that does not include statistics gathering processes.

Figure 8:
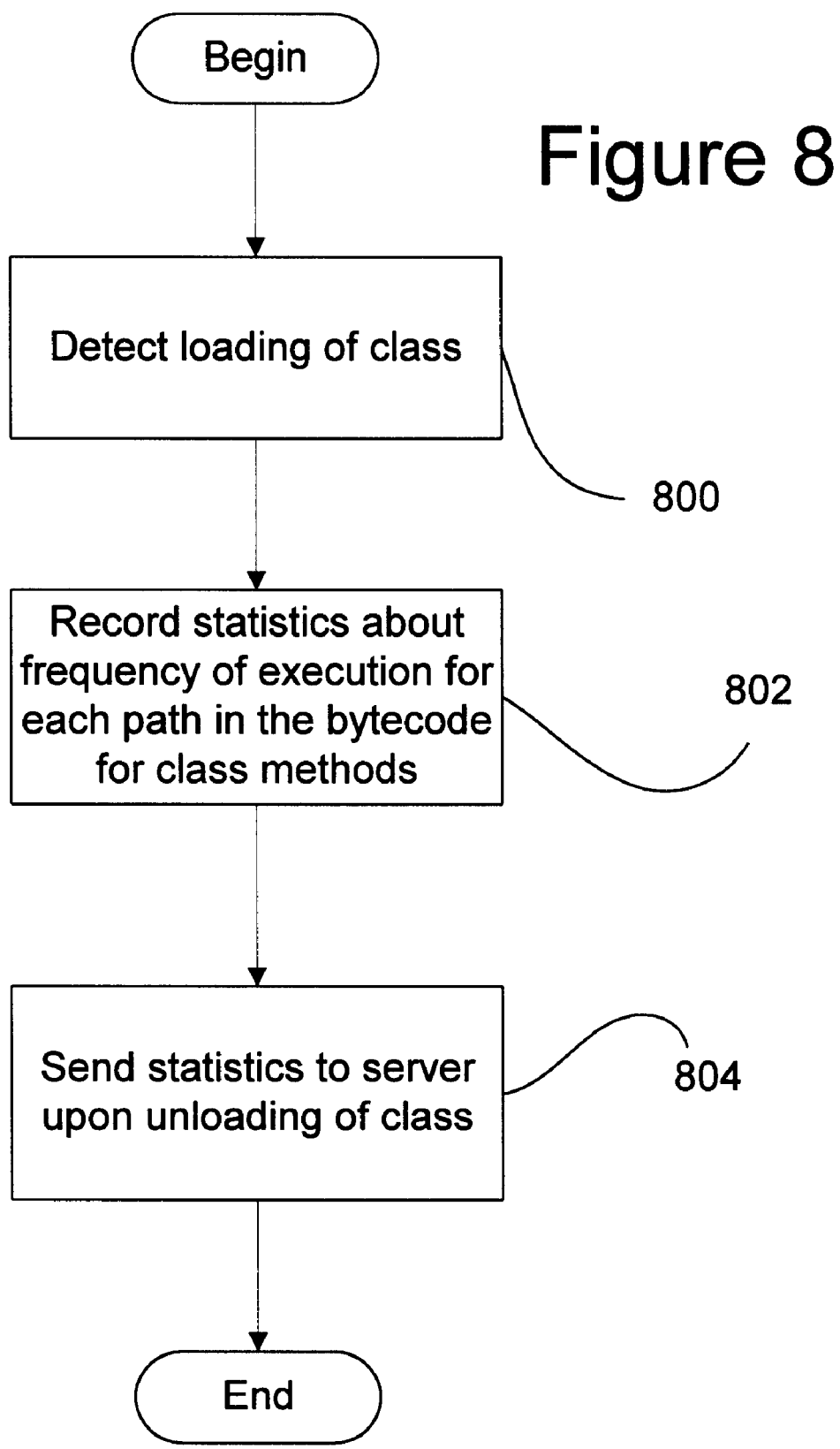
FIG. 8 is a flowchart of a process used by a server to process statistics in accordance with a preferred embodiment of the present invention.

Turning now to FIG. 8, a flowchart of a process used by an interpreter in a Java virtual machine to record statistics about execution of code in a client machine is depicted in accordance with a preferred embodiment of the present invention. The process begins by detecting loading of one or more classes for execution (step 800). Thereafter, statistics about the frequency of execution for each path in the bytecode for class methods are collected (step 802). These statistics are sent to the server upon unloading of the class or classes (step 804). Alternatively, the server may periodically poll the client for statistics.

Figure 9:
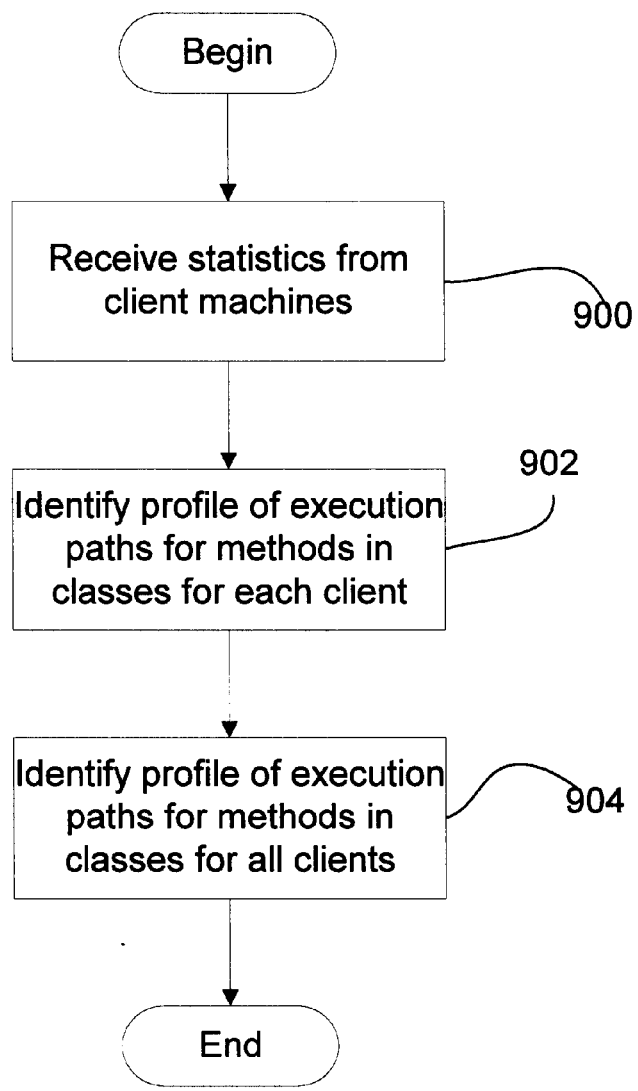
FIG. 9 is a flowchart of a process for selectively precompiling native code in accordance with a preferred embodiment of the present invention.

In FIG. 9, a flowchart of a process used by a server to process statistics is depicted in accordance with a preferred embodiment of the present invention. The process begins by receiving statistics from one or more client machines (step 900). These statistics may be received automatically from the clients or the server may poll the clients to receive the statistics on frequency of execution. A profile of execution paths in methods in classes for each client is compiled (step 902). This step allows for an identification of how frequently paths are executed for methods within a particular client. A profile of execution paths in methods in classes for all clients are compiled (step 904). This step provides a profile of the frequency of execution for all clients from which statistical information is received. Statistical information on frequency of execution of paths may be collected from all clients in a network, a single client, or from selected clients, such as clients in a work group or clients performing a selected function or task.

Turning now to FIG. 10, a flowchart of a process for selectively precompiling native code is depicted in accordance with a preferred embodiment of the present invention. The precompiling of native code and sending of the precompiled code to clients may be performed continually or on a periodic basis, depending on the amount of statistics gathered and depending on anticipated changes in the workload. Or alternatively, the precompiling of native code may be performed in response to a command from a system administrator or in response to a change in configuration of the network or a detected change in workload. When precompiling of code is performed in response to changes in workload, the initiation of the precompiling may be in response to a selected threshold being exceeded, in which the threshold may a number of time that a set of bytecodes are executed relative to overall execution of the bytecodes. For example, this threshold may be based on the number of times a set of bytecodes are executed over a given amount of time or a frequency of execution. The precompiling of code may be performed for all clients in a network, a single client, or from selected clients, such as clients in a work group or clients performing a selected function or task.

The process begins with a selection of bytecode paths for class methods for precompiling into native machine code (step 1000). The selection of paths may be performed in a number of ways. For example, paths may be selected based on the number of executions of a path exceeding a selected threshold. Alternatively, paths may be selected by ranking the executions of paths and selecting a number of ten of the most frequently executed paths. Platforms using the selected bytecode paths are identified (step 1002). This step is performed to determine what type of native machine code must be compiled. The selected bytecode paths are then precompiled into native machine code for the identified platforms (step 1004). The code is then distributed in class files to the clients (step 1006). Although in the depicted examples, the bytecodes and native machine code is distributed in FCCFs, other mechanisms may be used.

Thus, the present invention provides an improved method and apparatus for increasing execution speed of Java programs and applications. The present invention provides this advantage by collecting statistics on the frequency of execution of code paths in the bytecode of class methods and uses the statistics to selected paths that are pre-compiled into native machine code. The combination of bytecodes for little executed paths and native machine code for frequently executed paths are sent to the client for execution.

The need for a JIT compiler on a client is reduced or eliminated saving storage space and JITing time. In addition, bytecodes, which consume less space are downloaded for infrequently executed code while native machine code is downloaded for frequently executed code, resulting in the appearance of near native execution speeds while having the benefits of reduced code size for infrequently executed code. In addition, network traffic is reduced by decreasing the code size transferred from a server to clients.

Although the depicted example is directed towards Java, the processes of the present invention can be applied to any type of interpreted code. The present invention may also be applied to systems that include an interpreter in which native code may be used to speed execution. Although the present invention illustrates the use of bytecodes, the present invention may be applied to other types of interpreted instruction sets.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a distributed data processing system for optimizing execution of a class, the method comprising:

identifying a frequency of execution of paths in interpreted instructions for methods for the class within the distributed data processing system;

compiling a portion of the paths into precompiled native machine code for the data processing system using the frequency of execution of paths; and sending the class to a client in the distributed data processing system.

2. The method of claim 1, wherein the portion of the paths are a compiled portion of the paths and wherein the compiled portion of the paths are executed more frequently that other portions of the paths.

3. The method of claim 1, wherein the interpreted instructions are bytecodes.

4. The method of claim 1, wherein the client is a group of client computers within the distributed data processing system and wherein the identifying step comprises:
   identifying execution of paths for the group of client computers within the distributed data processing system.

5. The method of claim 1, wherein the client is all of the client computers within the distributed data processing system and wherein the identifying step comprises:
   identifying execution of paths for all client computers within the distributed data processing system.

6. The method of claim 1, wherein the step of identifying is performed continually and the step of compiling is performed continually.

7. The method of claim 1, wherein the step of compiling is performed in response to a frequency of execution for the portion of the paths occurring more than a selected threshold.

8. A method in a distributed data processing system for optimizing execution of a class, the method comprising:
   identifying a frequency of execution of paths in interpreted instructions for methods for the class within the distributed data processing system;
   compiling a portion of the paths into precompiled native machine code for the data processing system using the frequency of execution of paths; and
   sending the class to a client in the distributed data processing system, wherein the step of sending a class to the client comprises sending a fully caffienated class file containing the precompiled native machine code to the client.

9. A method in a distributed data processing system for optimizing execution of a class, the method comprising:
   identifying a frequency of execution of paths in interpreted instructions for methods for the class within the distributed data processing system;
   compiling a portion of the paths into precompiled native machine code for the data processing system using the frequency of execution of paths; and
   sending the class to a client in the distributed data processing system, wherein the step of sending a class to the client comprises:
      providing a class file, wherein the class file includes a directory and interpreted instructions;
      modifying the class file to add the precompiled native machine code to the class file;
      adding a second directory, wherein the second directory provides access to the precompiled native machine code; and sending the class file to the client.

10. A method in a server computer for optimizing execution of a class by a plurality of client computers within a distributed data processing system, the method comprising:
    receiving information relating to a frequency of execution of paths in bytecodes for methods in the class from the plurality of client computers within the distributed data processing system;
    identifying a frequency of execution of paths in the bytecodes for methods in the class using the information received from the plurality of client computers, wherein the frequency is an identified frequency;
    selecting a portion of the paths in the bytecodes for methods in the class using identified frequency;
    compiling the portion of the paths in the bytecodes for methods in the class; and
    sending the class to the plurality of client computers.

11. A distributed data processing system comprising:
    identification means for identifying a frequency of execution of paths in interpreted instructions for methods for the class within the distributed data processing system;
    compiling means for compiling a portion of the paths into precompiled native machine code for the data processing system using the frequency of execution of paths; and
    sending means for sending the class to a client in the distributed data processing system.

12. The distributed data processing system of claim 11, wherein the portion of the paths are compiled portion of the paths and wherein the compiled portions of the paths are executed more frequently that other portions of the paths.

13. The distributed data processing system of claim 11, wherein the interpreted instructions are bytecodes.

14. The distributed data processing system of claim 11, wherein the client is a group of client computers within the distributed data processing system and wherein the identifying means comprises means for identifying execution of paths for the group of client computers within the distributed data processing system.

15. The distributed data processing system of claim 11, wherein the client is all of the client computers within the distributed data processing system and wherein the identifying means comprises means for identifying execution of paths for all client computers within the distributed data processing system.

16. The distributed data processing system of claim 11, wherein the identifying means is performed continually and the compiling means is performed continually.

17. The distributed data processing system of claim 11, wherein the step of compiling is performed in response to a frequency of execution for the portion of the paths occurring more than a selected threshold.

18. A distributed data processing system, comprising:
    identification means for identifying a frequency of execution of paths in interpreted instructions for methods for the class within the distributed data processing system;
    compiling means for compiling a portion of the paths into precompiled native machine code for the data processing system using the frequency of execution of paths; and
    sending means for sending the class to a client in the distributed data processing system, wherein the sending means comprises means for sending a fully caffienated class file containing the precompiled native machine code to the client.

19. A distributed data processing system, comprising:
    identification means for identifying a frequency of execution of paths in interpreted instructions for methods for the class within the distributed data processing system;
    compiling means for compiling a portion of the paths into precompiled native machine code for the data processing system using the frequency of execution of paths; and
    sending means for sending the class to a client in the distributed data processing system, wherein the sending means comprises:
       providing means for providing a class file, wherein the class file includes a directory and interpreted instructions;
       modification means for modifying the class file to add the precompiled native machine code to the class file;

addition means for adding a second directory, wherein the second directory provides access to the precompiled native machine code; and sending means for sending the class file to the client.

20. A server computer comprising:

reception means for receiving information relating to a frequency of execution of paths in bytecodes for methods in the class from a plurality of client computers in communication with the server computer;

identification means for identifying a frequency of execution of paths in the bytecodes for methods in the class using the information received from the plurality of client computers, wherein the frequency is an identified frequency;

selection means for selecting a portion of the paths in the bytecodes for methods in the class using identified frequency;

compiling means for compiling the portion of the paths in the bytecodes for methods in the class; and sending means for sending the class to the plurality of client computers.

21. A distributed data processing system having an object oriented system, the distributed data processing system comprising:

a plurality of communications links;

a plurality of clients connected to the plurality of communications links, wherein the plurality of clients execute a class in the object oriented system, the class having paths and wherein the plurality of clients collect information regarding execution of paths within the class, wherein the information is sent onto the plurality of communications links; and a server connected to the plurality of communications links, wherein the server receives the information, identifies a frequency of execution of paths, selects a portion of the paths based on the frequency of execution of paths, compiles the portion of the paths into native code for the plurality of clients to form an optimized class, and sends the optimized class to the plurality of clients.

22. The distributed data processing system of claim 21, wherein each of the plurality of clients sends the information onto the plurality of communications paths when the class is unloaded from the client.

23. The distributed data processing system of claim 21, wherein each of the plurality of clients sends information onto the plurality of communications paths to the sever in response to the sever polling the client for information.

24. A computer program product in a computer readable medium for optimizing execution of a class by a plurality of client computer within a distributed data processing system, the computer program product comprising:

first instructions for receiving information relating to a frequency of execution of paths in bytecodes for methods in the class from the plurality of client computers within the distributed data processing system;

second instructions for identifying a frequency of execution of paths in the bytecodes for methods in the class using the information received from the plurality of client computers, wherein the frequency is an identified frequency;

third instructions for selecting a portion of the paths in the bytecodes for methods in the class using identified frequency;

fourth instructions for compiling the portion of the paths in the bytecodes for methods in the class; and fifth instructions for sending the class to the plurality of client computers.

25. A computer program product in a computer readable medium for optimizing execution of a class by a plurality of client computers within a distributed data processing system, the computer program product, comprising:

first instructions for receiving information relating to a frequency of execution of paths in bytecodes for methods in the class from the plurality of client computers within the distributed data processing system;

second instructions for identifying a frequency of execution of paths in the bytecodes for methods in the class using the information received from the plurality of client computers, wherein the frequency is an identified frequency;

third instructions for selecting a portion of the paths in the bytecodes for methods in the class using identified frequency;

fourth instructions for compiling the portion of the paths in the bytecodes for methods in the class; and fifth instructions for sending the class to the plurality of client computers, wherein the fifth instructions comprise:

instructions for providing a class file, wherein the class file includes a directory and bytecodes;

instructions for modifying the class file to add the precompiled native machine code to the class file;

instructions for adding a second directory, wherein the second directory provides access to the precompiled native machine code; and instructions for sending the class file to the client.

26. A method for optimizing execution of a class, the method comprising:

identifying a frequency of execution of paths in interpreted instructions for methods for the class;

compiling a portion of the paths into precompiled native machine code for a data processing system using the frequency of execution of paths;

sending the class to the data processing system, wherein the data processing system includes a group of client computers and wherein the identifying step comprises identifying execution of paths for the group of client computers within the data processing system, and wherein the portion of the paths compiled into precompiled native machine code is a portion of the paths which are executed by the group of client computers more frequently than other paths.

27. A method for optimizing execution of a class, the method comprising:

identifying a frequency of execution of paths in interpreted instructions for methods for the class;

compiling a portion of the paths into precompiled native machine code for a data processing system using the frequency of execution of paths; and sending the class to the data processing system, wherein the data processing system is all of the client computers within a distributed data processing system and wherein the identifying step comprises identifying execution of paths for all client computers within the distributed data processing system, and wherein the portion of the paths compiled into precompiled native machine code is a portion of the paths which are executed by the client computers more frequently than other paths.

* * * * *

UNITED STATES PATENT AND TRADEMARK OFFICE
CERTIFICATE OF CORRECTION

PATENT NO. : 6,631,515 B1 Page 1 of 1
APPLICATION NO. : 09/159955
DATED : October 7, 2003
INVENTOR(S) : Berstis It is certified that error appears in the above-identified patent and that said Letters Patent is hereby corrected as shown below:

Title Page, Item (74) Attorney, Agent, or Firm: delete "Stephen J. Walden, Jr." and insert --Stephen J. Walder, Jr.--.

Signed and Sealed this

First Day of April, 2008

JON W. DUDAS
*Director of the United States Patent and Trademark Office*